United States Patent [19]

Geisreiter

[11] Patent Number: 5,273,311
[45] Date of Patent: Dec. 28, 1993

[54] GAS GENERATOR

[75] Inventor: Christian Geisreiter, München, Fed. Rep. of Germany

[73] Assignee: Bayern-Chemie airbag GmbH, Aschau, Fed. Rep. of Germany

[21] Appl. No.: 961,317

[22] Filed: Oct. 15, 1992

[30] Foreign Application Priority Data

Oct. 19, 1991 [DE] Fed. Rep. of Germany ... 9113005[U]

[51] Int. Cl.⁵ ............................................. B60R 21/26
[52] U.S. Cl. .................................. 280/736; 280/740; 55/504
[58] Field of Search ................... 280/736, 740; 55/495, 55/511, 504

[56] References Cited

U.S. PATENT DOCUMENTS

| | | | |
|---|---|---|---|
| 2,964,127 | 12/1960 | Korn | 55/504 |
| 3,058,279 | 10/1962 | Metcalfe | 55/495 |
| 3,243,042 | 3/1966 | Moulton | 55/502 |
| 3,418,794 | 12/1968 | Roberts | 55/511 |
| 3,819,205 | 6/1974 | Dunford et al. | 280/740 |
| 5,149,129 | 9/1992 | Unterforsthuber et al. | 280/740 |

FOREIGN PATENT DOCUMENTS

| | | |
|---|---|---|
| 3921472 | 11/1990 | Fed. Rep. of Germany . |
| 3921473 | 11/1990 | Fed. Rep. of Germany ...... 280/736 |
| 3939021 | 11/1990 | Fed. Rep. of Germany ...... 280/736 |

Primary Examiner—Tim Miles
Attorney, Agent, or Firm—Evenson, McKeown, Edwards & Lenahan

[57] ABSTRACT

A gas generator, which can be used to inflate an airbag, that has a perforated outer housing wall, a fuel chamber, an expansion chamber which adjoins the fuel chamber and is connected to the fuel chamber via openings, includes a surrounding filter resting against the outer housing wall. A filter tube holds and supports the filter. To provide a secure and uniform sealing of the edge of the filter along the entire circumference of the outer housing wall, a ring-shaped clamping device is provided between the filter tube and the edge of the filter. The clamping device presses the edge of the filter against the outer housing wall.

14 Claims, 1 Drawing Sheet

GAS GENERATOR

BACKGROUND AND SUMMARY OF THE INVENTION

The present invention relates to a gas generator comprising an expansion chamber which adjoins the fuel chamber, is connected to the fuel chamber by means of openings and has filters for the emerging gas flow, a surrounding filter resting against the perforated outer housing wall and being held and supported by a partition which is a filter tube.

It is important in the case of gas generators to let the gas flow generated in the fuel chamber flow out of the openings in the outer wall of the housing as fast and as uniformly as possible for the purpose of filling up the air bag. In this case, the gas must be cooled and purified with respect to the particles contained in the gas flow.

For this purpose, the gas is first guided through a coarse-mesh filter and then through a fine-mesh filter resting against the outer housing wall (see German Patent Document 39 21 472 C1).

However, the fine-mesh filter, which extends down to the filter tube, does not absolutely and with its whole circumference rest against the outer wall of the housing. As a result, a portion of the gas escapes between the filter and the outer housing wall and is neither cooled nor filtered. A construction of the gas generator in which the filter is held by brackets which are punched out of the filter tube and bent does not satisfactorily solve the problem. This is because a sealing-off of the filter edge with respect to the outer wall of the housing makes sense only if it is effective along the entire circumference.

An object of the present invention is to provide a solution which avoids the above-mentioned disadvantages and achieves an effective filtering and purifying of the gas flow with respect to particles.

This and other objects are achieved by the present invention which provides a gas generator that has a perforated outer housing wall, a fuel chamber, an expansion chamber which adjoins the fuel chamber and is connected to the fuel chamber via openings, includes a surrounding filter resting against the outer housing wall. A filter tube holds and supports the filter. A ring-shaped clamping device is provided between the filter tube and the edge of the filter. The clamping device presses the edge of the filter against the outer housing wall.

With the present invention, a number of advantages are achieved. The ring-shaped clamping device seals off the edge of the filter facing the gas flow uniformly along the entire circumference with respect to the outer wall of the housing and holds it in its installed position. In the lower area, the filter is protected from local thermal overstressing by the gas flow flowing through the filter tube openings.

The preassembly of the clamping device is very simple. The ring-shaped clamping device is placed on the filter tube; when it is pressed on, it is automatically centered and fixed by means of the small supporting legs mounted on the inner edge.

In contrast to the previously known construction, the filter of the present invention may have a shorter design, whereby a cost advantage is achieved which outweighs the manufacturing costs of the clamping device. A slag trapping groove provided on the interior edge of the clamping device clearly reduces the proportion of fine and coarse particles in the gas flow and, as a result of the swirling-together of the gas, causes a more effective utilization of the filter entry area. On the whole, by means of the use of the clamping device, there is less reduction in the power of the gas generator than the use of customary methods for the filtering-out of particles.

Other objects, advantages and novel features of the present invention will become apparent from the following detailed description of the invention when considered in conjunction with the accompanying drawings.

DETAILED DESCRIPTION OF THE DRAWINGS

Figure 2:
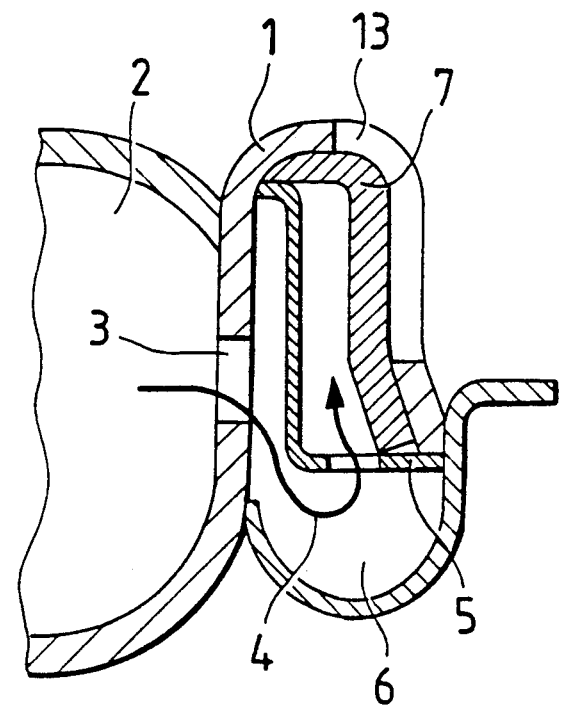
FIG. 2 is a cross-section of part of the outer circumference of a prior art gas generator.

For the purposes of comparison, FIG. 2 is a very simplified partial sectional view of a gas generator according to the state of the art. The housing 1 is manufactured as a sheet metal construction and comprises a fuel chamber 2. The propellant generated in the fuel chamber 2 escapes, as shown by the path of the gas flow 4, via openings 3 into an expansion chamber 6.

From there, the gas flow 4 leads through a perforated filter tube 5 into a second part of the expansion chamber 6. A filter 7 is arranged there which is situated in front of the outlet openings 13. The filter tube 5 holds the filter 7 in its position. The leakage problem exists at the point at which the gas flow 4, after passing through the filter tube 5, arrives on the filter 7. The reason is that the filter 7 is only insufficiently pressed against the housing wall 1.

Figure 1:
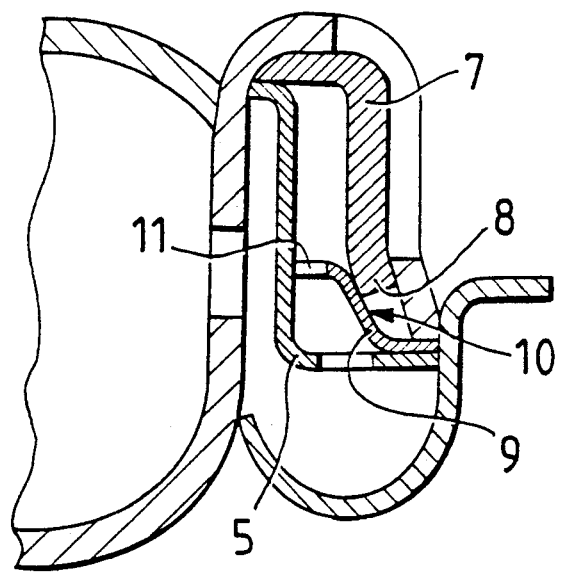
FIG. 1 is a cross-section of part of the outer circumference of a gas generator constructed in accordance with an embodiment of the present invention.

This disadvantage is eliminated in a simple manner by means of the embodiment of the present invention illustrated in FIG. 1. Before the assembly of the gas generator, a ring-shaped clamping device 9 is pushed onto the filter tube 5. In the sectional view, this clamping device has a flattened Z-shaped course. The inside edge of the clamping device 9, which points to the fuel chamber 2, has a number of small supporting legs 11 that are to be fixed to the filter tube 5. The generated propellant flows to the filter 7 through the spaces between the small supporting legs 11.

As easily recognizable in the sectional view of the clamping device 9, its center area has a ring-shaped surrounding contact surface 10. This contact surface 10 slopes at a flat angle toward the inside wall of the housing 1. As a result, the lower edge 8 of the filter 7 is clamped in and sealed off during the assembly. It is also easily recognizable that the filter 7 in FIG. 1 is considerably shorter than that in FIG. 2.

Figure 3:
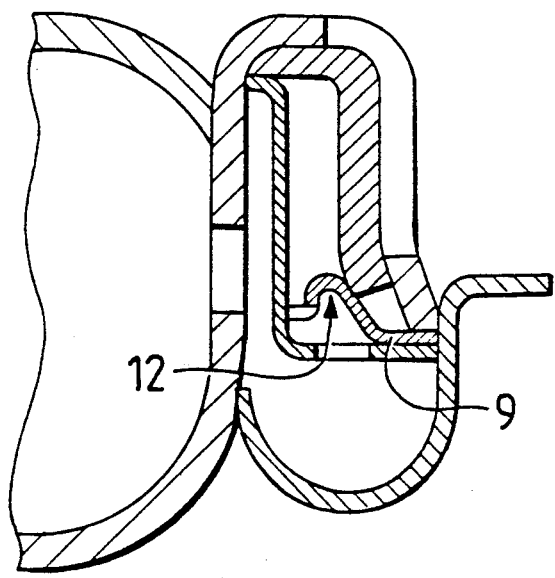
FIG. 3 is a cross-section of part of the outer circumference of a gas generator constructed in accordance with another embodiment of the present invention.

The clamping device 9 of FIG. 3 represents an alternative embodiment of the present invention. In this embodiment, a surrounding groove 12, which is open in the direction of the occurring gas flow, adjoins the contact surface 10. The slag particles in this groove 12, which are contained in the gas flow are caught. Also, the gas flow is swirled before it arrives on the filter.

The clamping device of the present invention reduces particle ejection without additional costs for other installations without considerably reducing, as in the case of other methods of particle filtering, the power of the gas generator.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A gas generator comprising:
   a perforated outer housing wall;
   a fuel chamber;
   an expansion chamber which adjoins the fuel chamber and is connected to the fuel chamber via openings;
   a surrounding filter resting against the outer housing wall, the filter having an edge;
   a filter tube that holds and supports the filter; and
   an automatically centering ring-shaped clamping device between the filter tube and the edge of the filter, the clamping device having a z-shape in cross-section with a center section that is acutely angled with respect to the outer housing wall, the center section pressing the edge of the filter against the outer housing wall in a circumferentially uniform manner.

2. The gas generator according to claim 1, wherein the clamping device has a groove which is open in a direction of approaching gas.

3. The gas generator according to claim 1, wherein the clamping device has an inner edge with supporting legs on said inner edge.

4. The gas generator according to claim 3, wherein the clamping device has a groove which is open in a direction of approaching gas.

5. The gas generator according to claim 1, wherein the clamping device has a contact surface which extends in a sloped manner toward the outer housing wall.

6. The gas generator according to claim 5, wherein the clamping device has a groove which is open in a direction of approaching gas.

7. The gas generator according to claim 5, wherein the clamping device has an inner edge with supporting legs on said inner edge.

8. The gas generator according to claim 7, wherein the clamping device has a groove which is open in a direction of approaching gas.

9. A gas generator comprising:
   a perforated outer housing wall;
   a fuel chamber;
   an expansion chamber which adjoins the fuel chamber and is connected to the fuel chamber via openings;
   a surrounding filter resting against the outer housing wall, the filter having an edge;
   a filter tube that holds and supports the filter; and
   a ring-shaped clamping device between the filter tube and the edge of the filter, the clamping device pressing the edge of the filter against the outer housing wall;
   wherein the clamping device has a contact surface which extends in a sloped manner toward the outer housing wall; and
   wherein the clamping device has an inner edge with supporting legs on said inner edge.

10. The gas generator according to claim 9, wherein the clamping device has a groove which is open in a direction of approaching gas.

11. A gas generator comprising:
    a perforated outer housing wall;
    a fuel chamber;
    an expansion chamber which adjoins the fuel chamber and is connected to the fuel chamber via openings;
    a surrounding filter resting against the outer housing wall, the filter having an edge;
    a filter tube that holds and supports the filter; and
    a ring-shaped clamping device between the filter tube and the edge of the filter, the clamping device pressing the edge of the filter against the outer housing wall; and
    wherein the clamping device has an inner edge with supporting legs on said inner edge.

12. The gas generator according to claim 11, wherein the clamping device has a groove which is open in a direction of approaching gas.

13. A gas generator comprising:
    a perforated outer housing wall;
    a fuel chamber;
    an expansion chamber which adjoins the fuel chamber and is connected to the fuel chamber via openings;
    a surrounding filter resting against the outer housing wall, the filter having an edge;
    a filter tube that holds and supports the filter; and
    a ring-shaped clamping device between the filter tube and the edge of the filter, the clamping device pressing the edge of the filter against the outer housing wall;
    wherein the clamping device has a contact surface which extends in a sloped manner toward the outer housing wall; and
    wherein the clamping device has a groove which is open in a direction of approaching gas.

14. A gas generator comprising:
    a perforated outer housing wall;
    a fuel chamber;
    an expansion chamber which adjoins the fuel chamber and is connected to the fuel chamber via openings;
    a surrounding filter resting against the outer housing wall, the filter having an edge;
    a filter tube that holds and supports the filter; and
    a ring-shaped clamping device between the filter tube and the edge of the filter, the clamping device pressing the edge of the filter against the outer housing wall;
    wherein the clamping device has a groove which is open in a direction of approaching gas.

* * * * *